Feb. 12, 1929.
A. C. GORTON
1,701,560
CAKE BAKING PAN
Filed Feb. 24, 1928
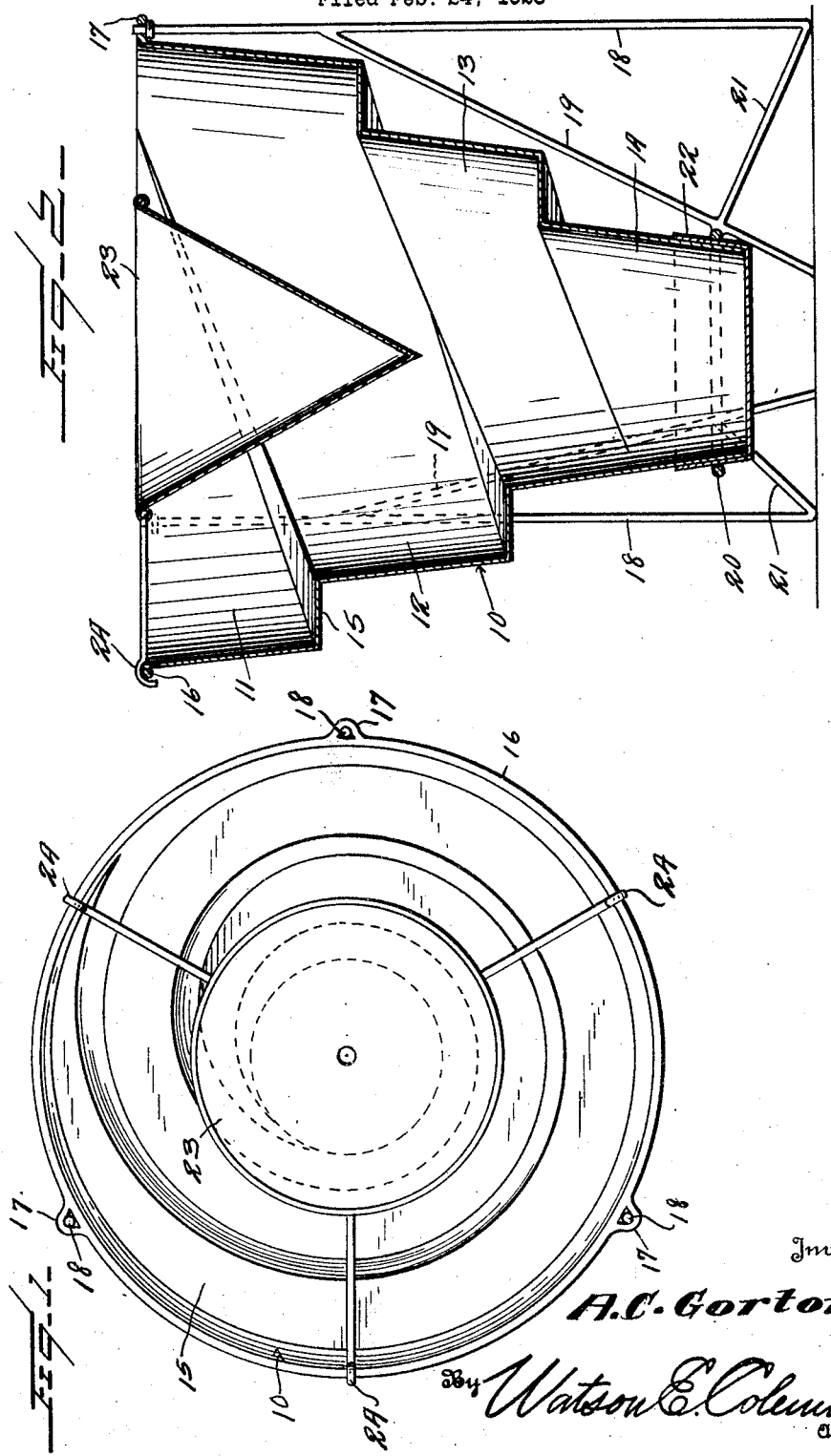
Inventor
A.C. Gorton
By Watson E. Coleman
Attorney Patented Feb. 12, 1929.

1,701,560

UNITED STATES PATENT OFFICE.

AUGUSTINE C. GORTON, OF WHITTENBURG, TEXAS.

CAKE-BAKING PAN.

Application filed February 24, 1928. Serial No. 256,638.

This invention relates to cake pans, and the general object is to provide a pan for the purpose of baking a layer cake or tier cake. In making layer or tier cake, the chefs have great difficulty, in that the layers have to be baked separately and then placed one on top of the other.

A further object of the present invention is to provide a baking pan of this character which is so constructed that all the layers of a cake may be baked at the same time and in which the cake so baked will not fall or flatten regardless of the number of tiers or layers which are used or the weight of the decorations thereon.

A still further object is to provide a cake pan so constructed that a layer or loaf cake of very ingenious and interesting form may be baked therein.

Another object is to provide a pan of this character and a rack for supporting the same inside the oven, and provide a funnel-shaped core in connection with the pan whereby the interior of the cake may be made hollow and thus permit the cake to thoroughly bake.

Other objects will appear in the course of the following description.

My invention is illustrated in the accompanying drawing, wherein:—

Figure 1 is a top plan view of my cake baking pan;

Figure 2 is a vertical sectional view.

Referring to this drawing, it will be seen that the pan 10 is formed to provide a series of tiers 11, 12, 13 and 14 of different diameters, the smallest tier being at the bottom and the larger tier at the top so that the pan has the form of a hollow inverted stepped cone. Preferably, however, the pan is in the form of a gradually decreasing spiral. The spiral bottom wall 15 of each connected section 11, 12, 13 and 14 extends spirally downward and around the pan, as shown, and eventually terminating within the lowermost section 14 of the pan in the manner disclosed, this spiral shoulder or bottom 15 extending up to the top of the pan.

The top of the pan is formed with a relatively large bead 16 formed with outwardly projecting eyes 17 so as to be engaged by a rack or supporting tripod having the vertically extending legs 18 and the inwardly extending braces 19. These braces extend downward to the same extent as the legs 18. The lower end of the pan is embraced by a ring 20, to which the braces 19 are connected, and the lower end of the legs 18 may be also connected by upwardly and inwardly extending braces 21 to said ring. I do not wish to be limited to this, as it is obvious that the tripod may be differently constructed. The whole purpose of the tripod is to support the baking pan within the oven in an upright position and permit heat to get to every portion of the pan.

Preferably the lower end or section 14 of the pan is formed with a removable cap 22 which fits within the ring 20. Coacting with the pan is a core 23 having radiating arms 24 at its upper end, which arms are adapted to rest upon the annular rim 16. By this means the cake, when it is eventually baked, is hollow in the center, this hollow center permitting the head to reach all parts of the cake and to have the interior of the cake thoroughly baked as well as the exterior thereof. Thus a more even baking will result. The cake is to be baked upside down and if it should stick in the baking, the cap 22 may be removed and a knife blade run around the cake to loosen it from the walls and then the cake will fall out of the pan. This is not ordinarily necessary, however. While I have heretofore referred to the cake being formed in layers or tiers of materially different character, I do not wish to be limited to this as the cake may be in the form of a loaf cake of one material throughout.

It will be seen that a cake having the form disclosed is novel in shape because the different layers will be arranged in spiral relation to each other. The cake has an ornamental form and permits of extensive and interesting decoration. The cake pan does away with the necessity of baking each layer separately of a layer cake or tier cake and this is for the reason that each layer is slightly smaller in diameter than the next adjacent layer so that the heat will pass to each layer of the cake through the approximately horizontal portions 15. This spiral bottom portion or off-set portion 15 produces, when the cake is baked, a spiral track extending spirally around the cake from the bottom to the top thereof upon which ornamental figures may be placed. By making the lower section or bottom 22 removable, it is possible to thoroughly clean the cake pan and it is also possible to use the cake pan in an inverted position, pouring the batter into the top, that is, into the smaller section instead of pouring the batter through the larger section of the cake pan.

While I have illustrated a certain form of cake pan which I have found to be particularly effective, I do not wish to be limited to the details of construction shown as these might be varied in many ways without departing from the spirit of the invention.

I claim:—

1. A cake baking pan having a flat bottom and vertical side walls forming a helix.

2. A cake baking pan having a flat bottom and vertical side walls forming a helix, the pan being larger at its upper end than at its bottom, and the bottom being removable.

3. A cake baking pan having a flat removable bottom and vertical side walls forming a helix, the bottom being smaller in cross sectional area than the top of the pan, a rack for supporting the pan, and the rack engaging the larger end thereof.

4. A cake baking pan having a flat removable bottom relatively small in area and having vertical side walls defining a helix, and a tripod for engaging the pan, the rim of the pan being provided with apertures and the tripod having a portion projecting into said apertures, said tripod also having an annulus surrounding the small end of the pan.

5. A cake baking pan having a flat bottom and vertical side walls forming a helix, the upper portion of the pan being larger in cross sectional area than the bottom of the pan, and a cone-shaped core inserted into the larger end of the pan, and having means at the large end of the core whereby it may be supported upon the larger end of the baking pan.

In testimony whereof I hereunto affix my signature.

AUGUSTINE C. GORTON.